United States Patent [19]

Berkmann

[11] 4,245,551

[45] Jan. 20, 1981

[54] COATING BOOTH FOR ELECTROSTATIC APPLICATION OF PULVERIZED MATERIALS

[75] Inventor: Adolf Berkmann, Weissach, Fed. Rep. of Germany

[73] Assignee: Nordson Corporation, Amherst, Ohio

[21] Appl. No.: 17,879

[22] Filed: Mar. 5, 1979

Related U.S. Application Data

[63] Continuation-in-part of Ser. No. 15,408, Feb. 26, 1979, abandoned.

[51] Int. Cl.³ .............................................. B05C 15/00
[52] U.S. Cl. .............................. 98/115 SB; 55/341 R; 55/356; 55/358; 55/502; 118/326; 118/DIG. 7
[58] Field of Search .............. 98/115 SB, 115 R; 118/326, DIG. 7; 55/341 R, 356, 358, 422, 481, 502, 309, 310, 313

[56] References Cited

U.S. PATENT DOCUMENTS

| | | | |
|---|---|---|---|
| 1,418,731 | 6/1922 | Paasche | 98/115 SB |
| 1,479,714 | 1/1924 | Herdle | 55/310 X |
| 2,310,205 | 2/1943 | Bell | 118/326 |
| 2,694,466 | 11/1954 | Bingman | 98/115 SB |
| 3,719,030 | 3/1973 | Blankemeyer et al. | 98/115 SB X |
| 3,801,869 | 4/1974 | Masuda | 98/115 SB X |
| 3,824,912 | 7/1974 | Jensen et al. | 98/115 SB |
| 3,899,311 | 8/1975 | Rapp | 55/341 R X |
| 3,905,785 | 9/1975 | Fabre | 98/115 SB X |
| 4,127,106 | 11/1978 | Jensen | 98/115 SB |

FOREIGN PATENT DOCUMENTS

| | | | |
|---|---|---|---|
| 595002 | 3/1934 | Fed. Rep. of Germany | 98/115 SB |
| 443104 | 12/1948 | Italy | 118/326 |
| 1315671 | 5/1973 | United Kingdom | |

Primary Examiner—Albert J. Makay
Assistant Examiner—Harold Joyce
Attorney, Agent, or Firm—Wood, Herron & Evans

[57] ABSTRACT

A coating booth for the electrostatic application of powdery materials onto workpieces. The coating booth has a generally tubular configuration which when viewed in side elevation is generally oval but with a spiral curved bottom front wall which melds into a flat bottom surface extending toward an outlet at the bottom of the rear wall of the booth. On the rear of the booth there is a fixed fan module to which a removable filter module may be attached so as to interconnect the booth air outlet with the suction fan module. This construction facilitates quick color changes of the powdery material by maintaining a minimum deposit of powder on the interior of the booth and by enabling the filters to be interchanged without the necessity of first cleaning the filters or of interchanging individual filter media before restarting the booth with a new color.

4 Claims, 4 Drawing Figures

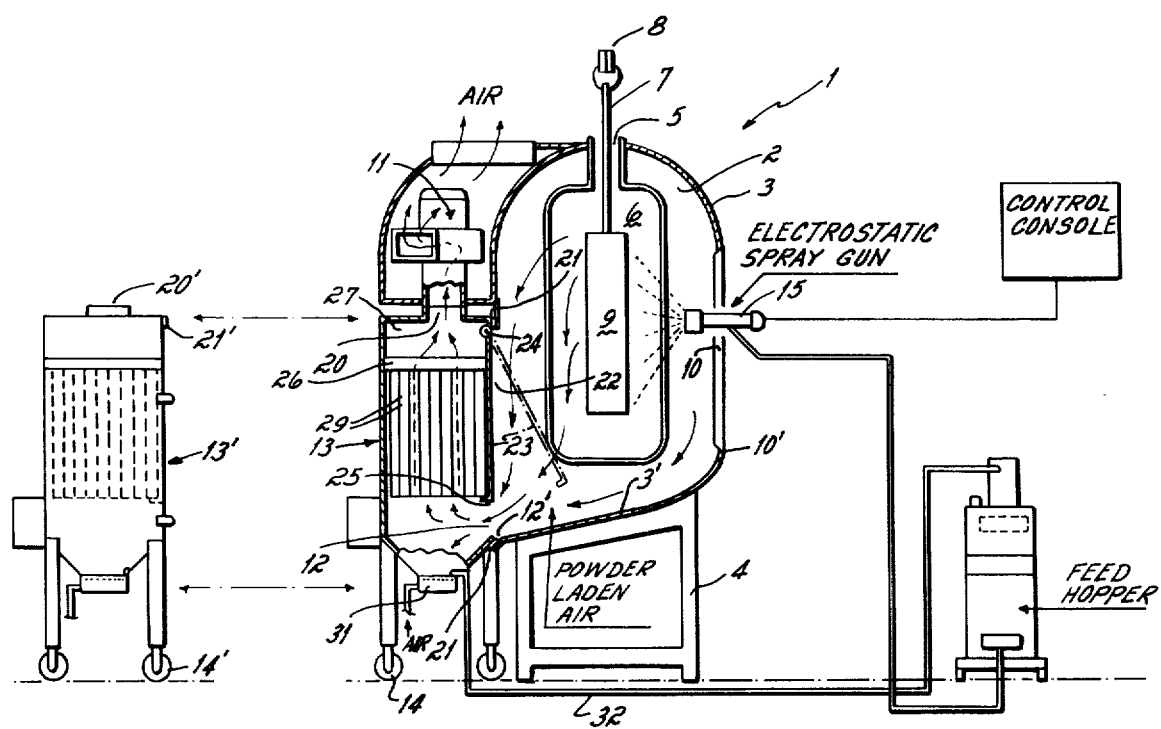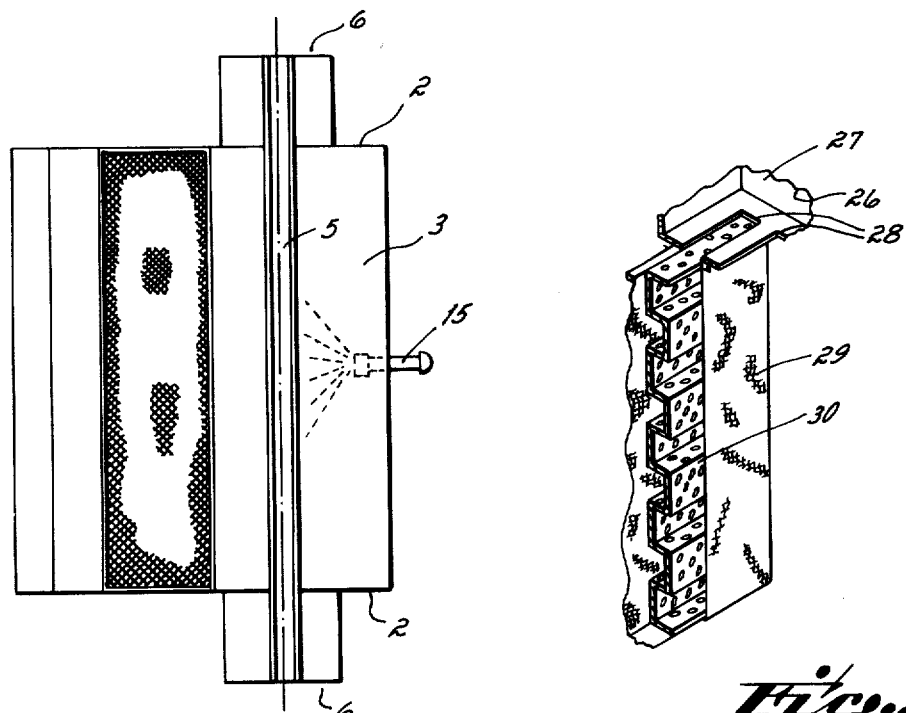

COATING BOOTH FOR ELECTROSTATIC APPLICATION OF PULVERIZED MATERIALS

This application is a continuation-in-part of U.S. patent application Ser. No. 15,408, filed Feb. 26, 1979, now abandoned, entitled "Coating Booth for Electrostatic Application of Pulverized Materials".

The invention relates to a coating booth for electrostatic application of pulverized or powder materials, especially paint on workpieces in which the powder particles not remaining clinging to the workpieces are carried out in an air flow produced by means of a suction device entering through an inlet in the coating booth and extracted from an outlet.

Most prior powder coating booths have a cross section located in the plane of the air flow which is square or rectangular. Even if not square or rectangular, the prior booths generally still retained sharp corners. A considerable feature of these prior booths is that the corners caused the excess particles which did not remain clinging to the workpieces to settle there. As long as the same or only a single powder is used in the booth, and as long as no excessive layer thickness is formed, which would be objectionable for safety reasons, this accumulation of particles can be tolerated.

When changing the powder, especially with paint material, it is necessary to clean the coating booth completely before changing over to another paint. This is an extremely time-comsuming operation which can take up to several hours, depending on the size of the coating booth. For this reason, changeovers in the coating powder are only made when the new powder can be used for a long time, which presupposes a large amount of workpieces. For smaller companies, who often have to make such a change, the loss in working hours incurred by the cleaning time is often no longer justifiable. These long cleaning times are explained by the fact that there must be no particles remaining of the previous color, so no mixed colors occur in the coating powder.

The object of this invention is to considerably shorten the necessary cleaning time when changing the coating powder. This problem is solved according to the invention in that the coating booth has a basically tubular form and a boundary wall which, at least in the flow area from the inlet to the outlet, is formed fundamentally as part of a radius of a circle which smoothly blends into a bottom flat floor of the booth extending in the direction of the outlet.

This arrangement enables the particles not clinging to the workpiece to be carried along in a flow which passes in the area of the boundary wall between the inlet and the outlet without noteworthy turbulence, as there are no edges or corners but the boundary wall is formed to favor the flow so that no deposits of particles can form in this area. As the boundary has a smooth surface, it is easy to clean the clinging particles due to the electrostatic charge from this wall.

A particularly preferred embodiment of the coating booth according to the invention is that the cross section located in the plane of air flow is formed by the coating booth in a generally circular, elliptic or spiral-shaped fashion, which spirals terminate in a flat floor extending rearwardly and slightly downwardly in the direction of the outlet. In this embodiment, it is ensured that no corners or edges are present over the whole cross section of the booth in which material accumulations could form which render the cleaning operation difficult. This constant uninterrupted boundary wall which replaces the former ceilings, floors and side boundary walls can be scraped with an appropriate sized scraper or wiper and thus be cleaned in a short time. The only corners which remain in this coating booth are those which occur between the rotating boundary wall and the front walls, but these corners are not in the flow area so that no turbulence phenomena can appear here which lead to great deposits as is the case behind broken edges in a flow area.

The air flow outlet from the booth runs over the total length of the coating booth diagonally to the flow direction of the air so that the air flow is equally divided at a controlled velocity over the whole width of the boundary wall; due to this control only an extremely thin coat consisting of the powder used is obtained as a deposit on the floor of the booth and this deposit can be easily removed with a scraper. This construction is preferred in short coating booths whose length is basically one-to-one and a half times the dimension of the greatest diameter of the booth. These relatively short chambers, when constructed with the generally circular or oval cross section of the booth, have a relatively small upper surface on which accordingly little coating powder can remain clinging. Therefore, the time necessary for the cleaning process is reduced.

To still further minimize the time necessary to change from one powder to another, the inventive booth of this invention includes a removable filter module sealingly connected to the air/powder outlet of the booth and the suction fan module of the booth. Consequently, to change from one powder to another, the filters may be quickly changed by simply wheeling one filter module away and sliding another into place at the back of the powder spray booth. There is consequently no downtime of the booth required to either clean the filters or to change the individual filters as has heretofore been the practice.

Another aspect of this invention is predicated upon the improved filters of the filter modules. Most filters of powder spray systems are bag type filters through which a vacuum is drawn to pull the powder into contact with the surface of the filter. Periodically, when the vacuum is relieved through the bag, the filters are cleaned by shaking or vibrating them to shake the collected powder from the outside surface of the bag. To prevent collapse of the bags when the vacuum is drawn through them, they have in the past either been filled with a foam rubber or with a helical spring. The invention of this application improves upon the speed with which the bags may be cleaned by utilizing a square wave shaped perforated plate on the interior of each bag.

Still another aspect of this invention resides in the improved filter module in which one side is formed by a hinged gate to provide pressure relief in the event of a fire. Heretofore, the filter media have been maintained in a confined area with the result that if a fire ever occurred in the filter area, the filter compartment exploded. This invention has rendered the filter compartment explosion-proof by hinging one side open downwardly so that it is free to move outwardly in the event of a fire and a sudden expansion of gases within the compartment.

Still another aspect of this invention resides in the provision of the suction fan module attached to the rear of the spray booth. This construction enables the filter module to be changed without having to change the fan module. It also has the advantage of eliminating ductwork between the booth, the filter module, and the fan module. Elimination of this ductwork eliminates the cost of the ductwork, the explosion hazard created by closed ductwork, and enables a smaller capacity blower motor to operate the suction fan system.

The invention also relates to a coating unit which is characterized by a row of several coating booths according to the invention, whereby the coating booths are arranged directly behind one another and laterally reversed so that inlets and outlets of adjacent coating booths alternate with one another, i.e., that the spray units and suction units or recovery units of adjacent booths of the row alternate with one another from booth to booth.

The invention is represented in the drawing as an example. These show:

FIG. 1 is a cross sectional view of a coating booth incorporating the invention of this application.

FIG. 1A is a side elevational view of an auxiliary filter module for use in the coating booth.

FIG. 2 is a top plan view of the coating booth of FIG. 1.

FIG. 3 is a cross sectional view through one of the bag filters employed in the coating booth of FIG. 1.

Figure 4:
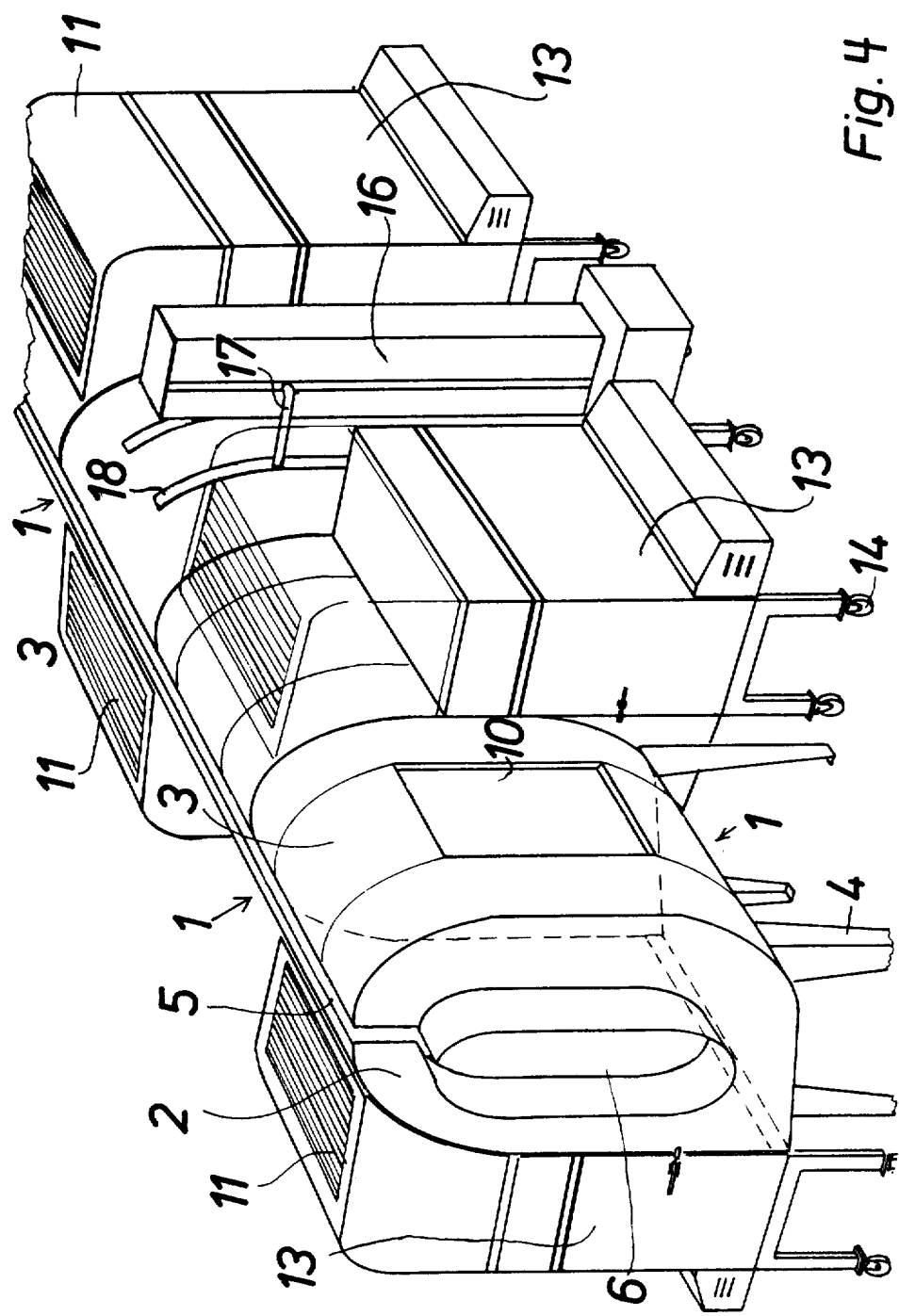
FIG. 4 is a diagrammatic representation of a coating unit consisting of several coating booths connected behind one another.

As we see from the drawing, a coating booth 1 is formed of a basically tubular shape and has end walls 2 and a casing type boundary wall 3 between the ends. The coating booth 1 is supported on feet 4.

In the upper part of the boundary wall 3 the coating booth 1 has a longitudinal slot 5 which extends for the length of the booth and through the end walls 2. This slot 5 extends downwardly and connects with an opening 6 in the end walls lying opposite one another. Through the slot 5, a holding device 7 grips a continuous conveyor 8 which is used to transport the workpieces 9 through the booth and through the openings 6 in the end walls.

The boundary wall 3 has an inlet 10 in the form of a window on one side through which an air stream, produced by the suction effect of a suction device 11, enters the coating booth and leaves it through an outlet 12 which extends for the full width of the booth. This outlet 12 is sized relative to suction fan 11 so that an air flow velocity of between 100 ft/min. and 200 ft./min. is maintained through the outlet when the fan 11 is operative. An air flow velocity below 100 ft./min. through the outlet 12 has been found to be insufficient to obtain the desired cleaning, sweeping action of the booth and a velocity above 200 ft./min. has been found to be destructive of the filter media contained within a filter module 13. The filter module 13 in the coating booth 1 is attached directly to the outlet 12. This filter module which is used to separate the excess particles contained in the air flow, is mounted on rollers 14 so that it may be quickly interchanged with an auxiliary filter module in the event of a powder or color change as explained more fully hereinafter. The air flow emerging from the filter device 13 passes upwardly into the suction fan model 11 which is fixedly mounted above the outlet 12 on the outer side of the boundary wall 3 in such a way that the filter module 13 fits exactly under the suction fan module 11.

The outlet 20 of the filter module 13 lies directly under and sealingly connects with the inlet of the suction fan module 11 in the operative position of the filter module 13 as shown in FIG. 1. When the color or the coating powder is changed, the operative filter module 13 is simply exchanged for another identical but clean filter module 13'.

As may be seen in FIG. 1, the coating booth 1 has a basically oval cross sectional configuration whereby the bottom and floor part of the boundary wall 3 which extends from the lower edge 10' of the window inlet 10 to the lower edge 12' of the outlet 12 is formed in the shape of a spiral which extends in the direction of the outlet 12. This part of the boundary wall is therefore formed so as to be smoothly curved from the front radiused section beneath the window opening 10 to the flat downwardly and rearwardly sloping bottom wall 3'. The angle at which the floor slopes downwardly and rearwardly has been found to be critical to the successful practice of the invention and the avoidance of air flow disturbance within the booth (which disturbance results in excessive collection of powder on the floor 3'). I have found that the floor must slope rearwardly at an angle to the horizontal which is from 0° to 12°. If the angle is greater than 12°, the air flow separates from the bottom wall 3' and instead of sweeping it clean into the outlet 12, leaves a powder deposit on the floor, and if the floor extends upwardly, turbulence is created and deposits of powder are left. The powders which are sprayed from a spray unit (in the represented example a spray gun 15) in the direction of the workpiece 9 to be coated, do not remain clinging to the boundary wall 3. As the upper part of the coating booth is also formed to favor the flow, the excess particles directed upwards around the workpiece 9 are almost completely directed downwards to the outlet 12 without causing them to cling to the boundary wall 3. The relatively small portion of particles which remain clinging to the wall in the form of an extremely thin layer, due to the discharge, can be easily removed from the smooth boundary wall 3 when changing the coating powder or the color.

With reference to FIG. 1A, it will be seen that there is a filter module 13' interchangeable with the module 13 located at the booth in FIG. 1. In the event of a powder change, such as occurs whenever there is a color change of powder being applied to the workpieces 9, the filter module 13 is removed and the new module 13' substituted. Both filter modules 13, 13' have a seal 21 which extends around the periphery of one side of the filter module and forms a seal between that side of the filter module and an opening 22 in the rear boundary wall 3. With the filter module in place, the rear boundary wall of the booth is in part formed on the side 23 of the filter module. This portion of the boundary wall formed by the wall 23 extends downwardly from the seal 21 to the top edge 25 of the outlet opening 12.

In order to explosion-proof the filter module 13, the wall 23 is suspended from a hinge 24 such that it is free to move outwardly to the phantom position illustrated in FIG. 1. In the event of a fire at the booth, the filter containing section of the module 13 is free to expand in volume because of the side 23 being free to spring inwardly into the booth. Thus, in the event of a fire and rapid expansion of gases within the filter module, there will be no explosion of the module.

Mounted within the interior of the filter module 13 there are a plurality of filter bags 29 which extend downwardly from a bottom wall 26 of a vacuum chamber 27. This bottom wall 26 has slots or openings 28 which communicate with the interior of the filter bags 29 suspended from the bottom wall 26. These bags collect powder on the surface when a vacuum is drawn through the bags by the suction fan module 11. To assist in cleaning the bags each bag includes a square wave shaped perforated metal plate 30 over which the bag is stretched. In practice, cleaning of the bags occurs when the fan is turned off. At the time the bags are shaken or vibrated so as to cause excess powder previously entrapped on the surface of the bags to fall downwardly into a collection chamber 31.

In the preferred embodiment the filter chamber 31 is a fluidized bed from which powder is removed and recycled via an air and powder flow line 32. Powder from the fluidized bed moves through line 32 to the feed hopper which in turn is operative to feed the electrostatic spray gun 15.

In operation, powder is sprayed from the spray gun onto the surface of the workpieces 9 as the workpieces are conveyed through the booth. Excessive powder which does not adhere to the workpieces is caused by the suction fan module to be pulled through the booth into the booth outlet 12 from whence the powder either falls out into the fluidized bed 31 or is entrapped on the surface of the filter bags 29. Periodically, when the suction fan module 11 is turned off and there is no vacuum being drawn on the bags, the bags are shaken or vibrated so as to cause powder adhered to the surface of the bags to fall down into the fluidized bed 31 and be recycled to the feed hopper. When a powder change is desired, as for example upon a change of color, the vacuum module 11 is turned off, the filter module 13 removed, and a new filter module 13' substituted for the original module 13 after cleaning of the interior surface of the booth. Because the booth is maintained relatively clean of powder, sweeping of the surface takes only a few minutes. After replacement of the new powder in the feed hopper, the clean booth is ready to be started with the new powder.

Having described the preferred embodiment of my invention, what I desire to claim and protect by Letters Patent is:

1. An integral assembly of a powder spray booth and filter unit, said powder spray booth being adapted to receive an electrostatic spray means for spraying dry particulate powder material onto workpieces contained in the booth, comprising:

first and second vertical walls and a floor angled downwardly from said first vertical wall toward said second vertical wall, a ceiling extending from the top of said first vertical wall generally toward said second vertical wall, vertical end walls extending from said first vertical wall generally toward said second vertical wall, a powder spray booth and a powder collection chamber disposed between said two vertical walls of the assembly, said booth and said powder collection chamber being separated by a imperforate third vertical wall, said imperforate third vertical wall extending downward from the ceiling so as to form a barrier to the flow of powder laden air from said booth into said powder collection chamber, an air inlet opening in first vertical wall of said booth, said third vertical wall having a lower edge spaced from said floor so as to define a booth outlet opening adjacent the lower edge thereof providing an air flow path through which powder laden air is free to pass without significant restriction from said booth into said collection chamber;

means for collecting oversprayed dry particulate powder material in the bottom of said powder collection chamber, said collecting means being operable to collect said powder material in a dry condition suitable for reuse in said electrostatic spray means, a clean air chamber sealed from the booth, said clean air chamber being located adjacent to and above said powder collection chamber, said clean air chamber having a clean air chamber opening from the powder collection chamber thereinto;

filter means mounted adjacent said clean air chamber opening for preventing powder from entering said clean air chamber from said booth outlet opening while permitting air flow from the powder collection chamber into said clean air chamber;

blower means connected to said clean air chamber to create a negative pressure in said clean air chamber, whereby air flows downwardly in said booth and through said booth outlet opening directly into said powder collection chamber and then upwardly through said filter means into said clean air chamber.

2. The powder spray booth and filter unit of claim 1 wherein said booth outlet opening is located beneath said third vertical wall of said booth, and the intersection of said first wall and said floor is formed as part of a spiral initially curved and melding into a flat bottom surface extending downwardly in the direction of the outlet opening.

3. The powder spray booth and filter unit according to claim 2, characterized in that the flat bottom surface of the booth extends rearwardly from an inlet opening toward the booth outlet opening at an angle to the horizontal which is not greater than approximately 12° sloping downwardly.

4. The powder spray booth and filter unit of claim 1 characterized in that the booth outlet opening extends over substantially the whole length of the coating booth generally perpendicular to the flow direction of the air through the booth.

* * * * *